United States Patent
Fan et al.

(10) Patent No.: US 10,887,693 B2
(45) Date of Patent: Jan. 5, 2021

(54) METHOD FOR SWITCHING MODE AND ELECTRONIC DEVICE EMPLOYING THE METHOD

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Sen Fan, Zhengzhou (CN); Jun-Wei Zhang, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 16/543,782

(22) Filed: Aug. 19, 2019

(65) Prior Publication Data
US 2020/0186924 A1     Jun. 11, 2020

(30) Foreign Application Priority Data
Dec. 7, 2018  (CN) .......................... 2018 1 1494773

(51) Int. Cl.
*H04R 3/04*     (2006.01)
*H04M 1/60*     (2006.01)

(52) U.S. Cl.
CPC ................ *H04R 3/04* (2013.01); *H04M 1/60* (2013.01); *H04R 2430/01* (2013.01)

(58) Field of Classification Search
CPC . H04R 3/04; H04R 3/005; H04R 3/00; H04R 2430/01; H04R 1/406; H04M 1/60; H04M 1/656; H04M 3/42221; H04M 2201/40; H04M 1/72569; H04M 1/6008
See application file for complete search history.

(56) References Cited

U.S. PATENT DOCUMENTS

2008/0070640 A1* 3/2008 Shin .................... H04M 19/044
                                                       455/567

FOREIGN PATENT DOCUMENTS

CN           101854425 A  * 10/2010

* cited by examiner

*Primary Examiner* — Yogeshkumar Patel
(74) *Attorney, Agent, or Firm* — ScienBiziP, P.C.

(57) ABSTRACT

A method for switching modes of an electronic device is presented. The method can collect sound of the predetermined scenario by a collector of the electronic device, and confirm prominent sound from the collected sound. When the duration of the prominent sound is greater than or equal to a first period of time, the method can confirm that the prominent sound is a sample sound, and switch the silent mode to ringing mode of the electronic device when the collector has not collected the prominent sound during a second period of time.

12 Claims, 2 Drawing Sheets

METHOD FOR SWITCHING MODE AND ELECTRONIC DEVICE EMPLOYING THE METHOD

FIELD

The subject matter herein generally relates to management of electronic devices, especially relates to a method for switching mode of an electronic device.

BACKGROUND

Electronic devices, such as mobile phones, can operate in different modes. For example, a silent mode, a ringing mode, and a vibration mode for incoming calls. However, the electronic device does not change the mode according to surrounding environment.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
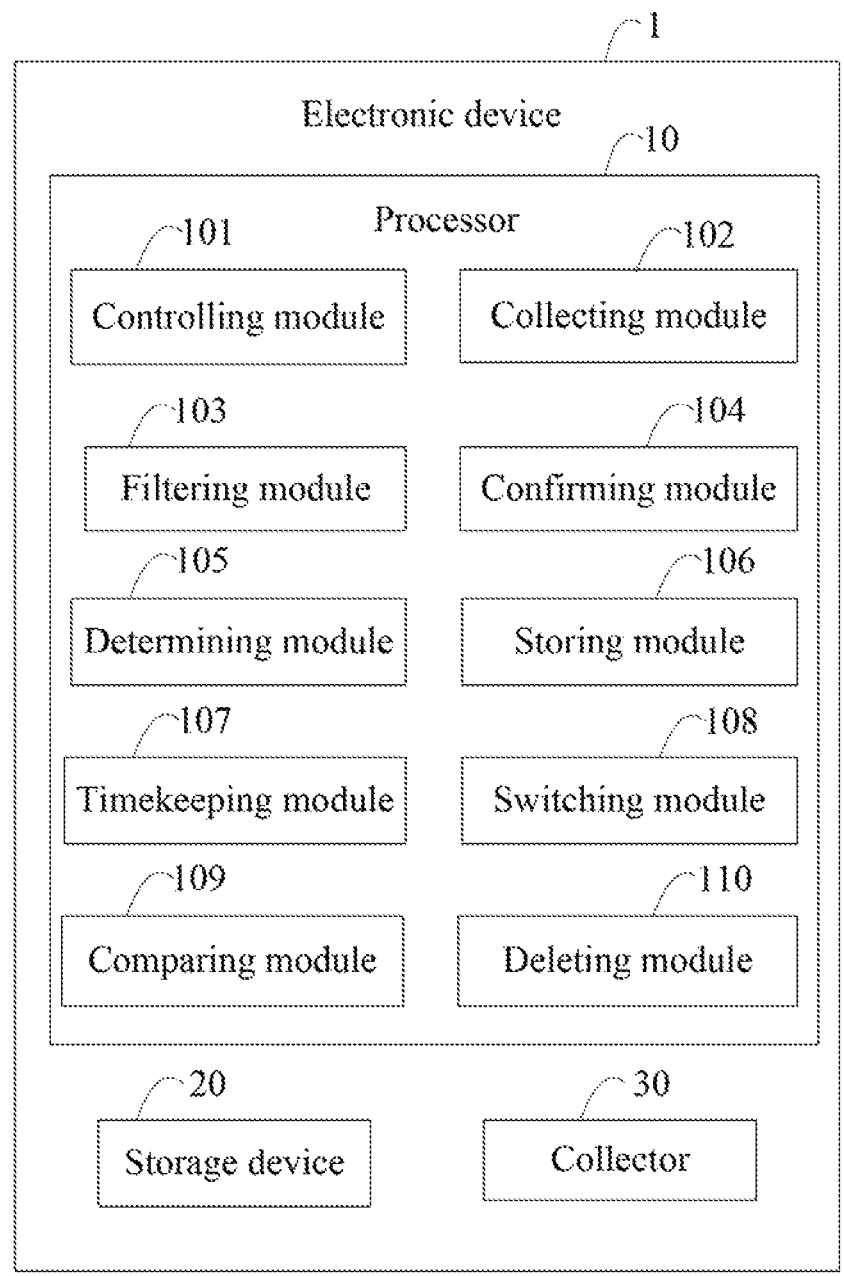
FIG. 1 is a block diagram of one embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

FIG. 1 shows a block diagram of one embodiment of an electronic device. Depending on the embodiment, the electronic device 1 can include, but is not limited to, at least one processor 10, a storage device 20, and a collector 30. The storage device 20, at least one processor 10, and the collector 30 communicate with each other through a system bus.

In at least one exemplary embodiment, the storage device 20 can be an internal storage device, such as a flash memory, a random access memory (RAM) for temporary storage, and/or a read-only memory (ROM) for permanent storage. The storage device 20 can also be an external storage device, such as an external hard disk, a storage card, or a data storage medium. The at least one processor 10 can be a central processing unit (CPU), a microprocessor, or other data processor chip that performs functions of the electronic device 1.

In at least one exemplary embodiment, the collector 30 can collect sounds in the surrounding environment. For example, the collector 30 can be a microphone.

In at least one exemplary embodiment, the electronic device 1 can be, but is not limited to, a smart phone, a tablet computer, a smart watch, or any other suitable electronic device having a ringing alert function. FIG. 1 illustrates only one example of the electronic device 1, other examples can comprise more or fewer components than those shown in the embodiment, or have a different configuration of the various components. For example, the electronic device 1 can further include a circuit system, input/output interface, a battery, an operating system, and so on.

In at least one exemplary embodiment, the processor 10 as shown in FIG. 1 can include, but is not limited to, a controlling module 101, a collecting module 102, a filtering module 103, a confirming module 104, a determining module 105, a storing module 106, a timekeeping module 107, a switching module 108, a comparing module 109, and a deleting module 110. The modules 101-110 can comprise computerized instructions in the form of one or more computer-readable programs that can be stored in a non-transitory computer-readable medium, for example in the storage device 20, and executed by the processor 10 of the electronic device 1. Functions of the modules 101-110 are as follows.

In at least one exemplary embodiment, the controlling module 101 can turn on a silent mode of the electronic device 1 when the electronic device 1 enters into a predetermined scenario.

In at least one exemplary embodiment, users can pre-set to-do items corresponding to the predetermined scenario in the electronic device 1. When it is time for the scheduled to-do items, the controlling module 101 can automatically control the electronic device 1 to turn on the silent mode. For example, if the predetermined scenario is having a meeting, the users can pre-set the to-do items for the meeting. The to-do items for the meeting can include the time for the meeting. When it is time for having the meeting, the electronic device 1 can turn on the silent mode automatically.

In other exemplary embodiment, when the electronic device 1 enters into the predetermined scenario, the user can also control the electronic device 1 to turn on the silent mode.

In at least one exemplary embodiment, the collecting module 102 can collect sounds of a predetermined scenario by the collector 30. When it is time for a to-do item of the predetermined scenario, the collecting module 102 can turn on the collector 30 to collect sounds of the surrounding environment. For example, if the predetermined scenario is having a meeting, persons are likely to speak at the meeting, and the collector 30 can collect the sounds. In other exemplary embodiment, the user can also turn on the collector 30 for collecting sounds.

In at least one exemplary embodiment, the filtering module 103 can filter noises of the collected sounds. "Noise" here means sound produced by other than persons speaking at the meeting. Frequency of sounds of people is generally from 65 Hz to 1100 Hz, the filtering module 103 can filter out sounds with the frequency less than 65 Hz and greater than 1100 Hz. Then, the sounds of people will be the only sounds recorded.

In at least one exemplary embodiment, the confirming module 104 can confirm a prominent sound from the collected sounds. The confirming module 104 can confirm the prominent sound from the filtered sounds. The sounds of different people have different frequencies. The confirming module 104 can confirm several different prominent sounds according to the frequencies of different people. The confirming module 104 further can determine volume of the sounds according to the amplitude, and confirm at least one prominent sound when the volume of the sound is greater than or equal to a predetermined volume. In this embodiment, the predetermined volume can be sound volume when a person is speaking loudly. For example, the predetermined volume can be 50 db. If the predetermined scenario is associated with a meeting, the prominent sound can be the sound of a chairman, or a keynote speaker, or a spokesperson. Each of such speakers will speak loudly or at length in the meeting.

In other exemplary embodiment, the prominent sound may be the sound with maximum volume, or there may be two high-volume sounds which are greater than a predetermined volume.

In at least one exemplary embodiment, the determining module 105 can determine whether duration of the prominent sound is greater than or equal to a first period of time. The determining module 105 can determine that the prominent sound is the sound which has spoken when the volume of the sound is greater than or equal to the predetermined volume, and the duration of the sound is greater than or equal to the first period of time. For example, the first period of time is two minutes. It can be understood that if the prominent sound has short interval (e.g., five seconds) within the first period of time, the determining module 105 can still determine that the prominent sound has last for the first period of time.

In at least one exemplary embodiment, the confirming module 104 can confirm that the prominent sound is the sample voice when the determining module 105 determines that the duration of the sound is greater than or equal to the first period of time. The storing module 106 can store the sample sound into the storage device 20.

In at least one exemplary embodiment, the timekeeping module 107 can start to count down for a second period of time when the storing module 106 stores the sample sound into the storage device 20. For example, the second period of time is 20 minutes.

In at least one exemplary embodiment, the determining module 105 can determine whether the collector 30 has collected the prominent sound during the second period of time.

In at least one exemplary embodiment, the switching module 108 can switch the silent mode to ringing mode of the electronic device 1 when the determining module 105 determines that the collector 30 has not collected the prominent sound during the second period of time.

In at least one exemplary embodiment, the determining module 105 can determine that the electronic device 1 has left the predetermined scenario when the collector 30 has not collected the prominent sound during the second period of time. The switching module 108 can then switch from the silent mode to the normal ringing mode.

In at least one exemplary embodiment, the comparing module 109 can compare the prominent sound with the sample voice to determine whether the prominent sounds is the same as the sample voice, when determining module 105 determined that the collector 30 has collected the prominent sound during the second period of time.

In at least one exemplary embodiment, the comparing module 109 can acquire voiceprint features of the sample sound and the prominent sound. The voiceprint features can include acoustic features, lexical features, and accent information. The acoustic features include frequency and cepstrum spectrums. The lexical features includes the word n-gram model and the phoneme n-gram model corresponding to the sound. The accent information includes speed, tone, and volume of the sound. The comparing module 109 can compare the acoustic feature of each sample sound with the acoustic feature of the prominent sound, and compare lexical feature of each sample sound with the lexical feature of the prominent sound, and compare accent information of each sample sound with the accent information of the prominent sound. The comparing module 109 can determined that the prominent sound is the same as the sample sound when the acoustic feature, lexical feature, and accent information of the prominent sound is the same as or similar to the acoustic feature, lexical feature, and accent information of the sample sound. And the comparing module 109 can determine that the prominent sound and the sample sound are from one person. The comparing module 109 can determined that the prominent sound is different from the sample sound when the acoustic feature, lexical feature, and accent information of the prominent sound is different from the acoustic feature, lexical feature, and accent information of one of the sample sound. Thus the comparing module 109 can determine that the prominent sound and the sample sound are from different persons.

In at least one exemplary embodiment, the determining module 105 can determine whether the duration of the prominent sound is greater than or equal to a third period of time, when the comparing module 109 determines that the prominent sound is different from any sample sound. For example, the third period of time can be one minute or other period. The timekeeping module 107 can start to count down for the third period of time when the comparing module 109 determines that the prominent sound is the same as any one sample sound.

In at least one exemplary embodiment, the confirming module 104 can confirm that the prominent sound is as a new sample sound when the determining module 105 determines that the duration of the prominent sound is greater than or equal to the third period of time. The storing module 106 can store the new sample sound into the storage device 20, and the electronic device 1 can remain in the silent mode.

In at least one exemplary embodiment, the deleting module 110 can delete the one or more sample sounds when the switching module 108 switches from the silent mode to the ringing mode of the electronic device 1.

Figure 2:
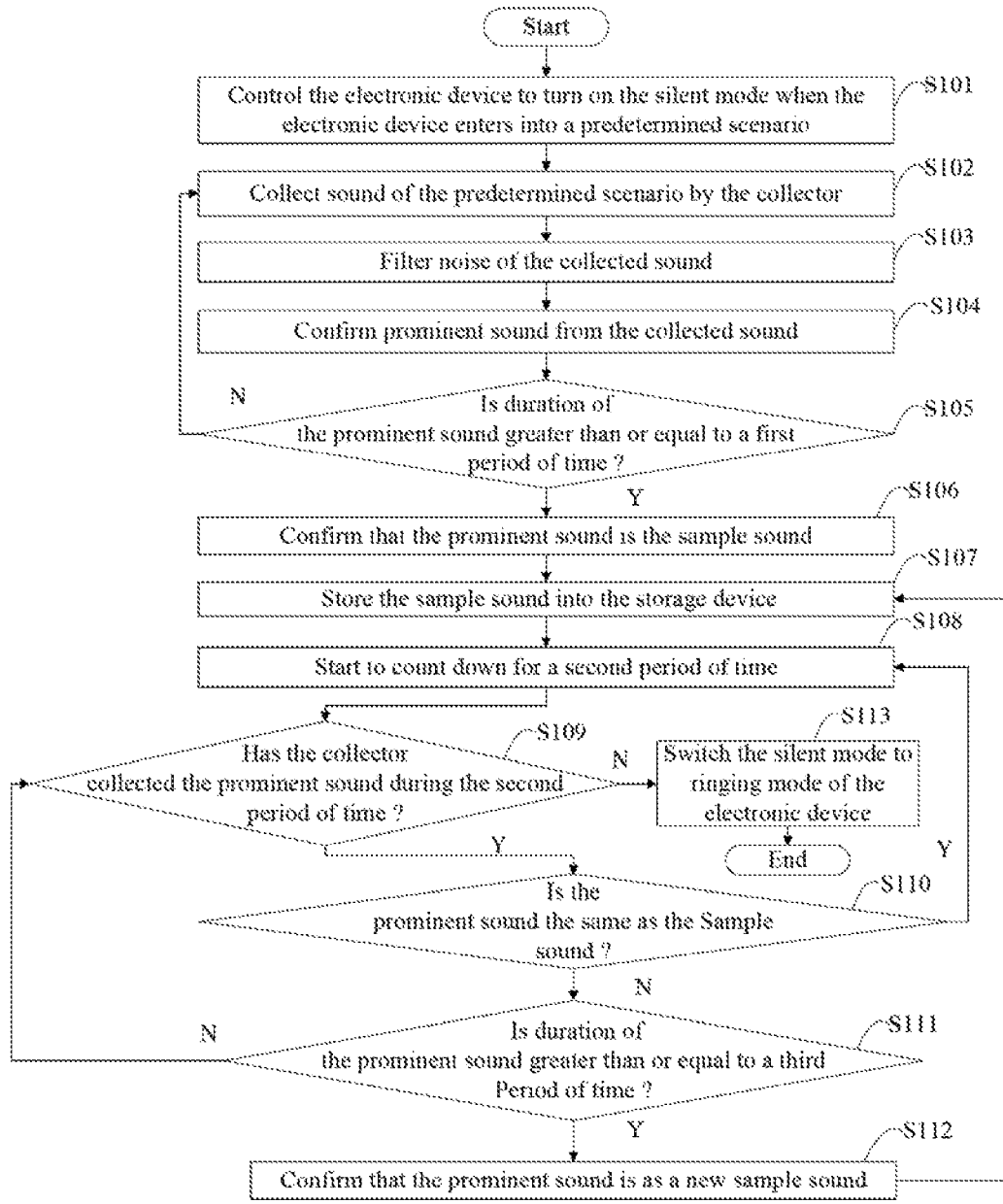
FIG. 2 illustrates a flowchart of one embodiment of a mode switching method using the electronic device of FIG. 1.

FIG. 2 illustrates a flowchart of a method for switching mode of the electronic device 1. In an example embodiment, the method is performed by execution of computer-readable software program codes or instructions by the processor 10 of the electronic device 1.

Referring to FIG. 2, the method is provided by way of example, as there are a variety of ways to carry out the method. The method described below can be carried out using the configurations illustrated in FIG. 1, for example, and various elements of these figures are referenced in explaining method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S101.

At block S101, the controlling module 101 can control the electronic device 1 to turn on the silent mode when the electronic device 1 enters into a predetermined scenario.

At block S102, the collecting module 102 can collect sound of the predetermined scenario by the collector 30.

At block S103, the filtering module 103 can filter noise of the collected sound.

At block S104, the confirming module 104 can confirm prominent sound from the collected sound.

At block S105, the determining module 105 can determine whether duration of the prominent sound is greater than or equal to a first period of time. When the duration of the prominent sound is greater than or equal to the first period of time, the process goes to block 106. When the duration of the prominent sound is less than the first period of time, the process returns to block 102.

At block S106, the confirming module 104 can confirm that the prominent sound is the sample sound when the determining module 105 determined that the duration of the sound is greater than or equal to the first period of time.

At block S107, the storing module 106 can store the sample sound into the storage device 20.

At block S108, the timekeeping module 107 can start to count down for a second period of time.

At block S109, the determining module 105 can determine whether the collector 30 has collected the prominent sound during the second period of time. When the collector 30 has collected the prominent sound during the second period of time, the process goes to block S110. When collector 30 has not collected the prominent sound during the second period of time, the process goes to block S113.

At block S110, the comparing module 109 can compare the prominent sound with the sample sound to determine whether the prominent sound is the same as the sample sound. When the prominent sound is the same as the sample sound, the process returns to block S108. When the prominent sound is different from the sample sound, the process goes to block S111.

At block S111, the determining module 105 can determine whether the duration of the prominent sound is greater than or equal to a third period of time. When the duration of the prominent sound is greater than or equal to the third period of time, the process goes to block S112. When the duration of the prominent sound is less than the third period of time, the process returns to block S109.

At block S112, the confirming module 104 can confirm that the prominent sound is a new sample sound, then the process returns to block S107.

At block S113, the switching module 108 can switch the silent mode to ringing mode of the electronic device 1.

In at least one exemplary embodiment, the method further include a step, the deleting module 110 can delete all the sample sound collected by the collector 30 when the switching module 108 switches the silent mode to ringing mode of the electronic device 1.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
a collector;
a storage device;
at least one processor; and
the storage device storing one or more programs that, when executed by the at least one processor, cause the at least one processor to:
turn on a silent mode of the electronic device when the electronic device enters into a predetermined scenario;
collect sound of the predetermined scenario by the collector;
confirm prominent sound from the collected sound;
determine whether a duration of the prominent sound is greater than or equal to a first period of time;
confirm that the prominent sound is sample sound when the duration of the prominent sound is greater than or equal to the first period of time;
determine whether the collector has collected the prominent sound during a second period of time;
switch the silent mode to ringing mode of the electronic device when the collector has not collected the prominent sound during the second period of time; and
store the sample sound into the storage device;
start to count down for a second period of time when storing the sample sound into the storage device;
collect the prominent sound during the second period of time;
determine whether the prominent sound is the same as the sample sound by comparing the prominent sound with the sample sound stored in the electronic device;
determine whether the duration of the prominent sound is greater than or equal to a third period of time when the prominent sound is different from any sample sound; and
confirm that the prominent sound is as a new sample sound when the duration of the prominent sound is greater than or equal to the third period of time.

2. The electronic device according to claim 1, wherein the at least one processor is further caused to:
confirm at least one prominent sound when volume of the collected sound is greater than or equal to a predetermined volume.

3. The electronic device according to claim 1, wherein the at least one processor is further caused to:
delete the sample sound when the silent mode is switched to ringing mode of the electronic device.

4. The electronic device according to claim 1, wherein the at least one processor is further caused to:
filter noise of the collected sound.

5. A mode switching method applied in an electronic device, the electronic device comprising a collector, the method comprising:
turning on a silent mode of the electronic device when the electronic device enters into a predetermined scenario;
collecting sound of the predetermined scenario by the collector;
confirming prominent sound from the collected sound;
determining whether a duration of the prominent sound is greater than or equal to a first period of time;
confirming that the prominent sound is sample sound when the duration of the prominent sound is greater than or equal to the first period of time;
determining whether the collector has collected the prominent sound during a second period of time;
switching the silent mode to ringing mode of the electronic device when the collector has not collected the prominent sound during the second period of time; and
store the sample sound into the storage device;
start to count down for a second period of time when storing the sample sound into the storage device;
collect the prominent sound during the second period of time;
determine whether the prominent sound is the same as the sample sound by comparing the prominent sound with the sample sound stored in the electronic device;
determine whether the duration of the prominent sound is greater than or equal to a third period of time when the prominent sound is different from any sample sound; and
confirm that the prominent sound is as a new sample sound when the duration of the prominent sound is greater than or equal to the third period of time.

6. The method according to claim 5, wherein the method further comprising:
confirming at least one prominent sound when volume of the collected sound is greater than or equal to a predetermined volume.

7. The method according to claim 5, wherein the method further comprising:
deleting the sample sound when the silent mode is switched to ringing mode of the electronic device.

8. The method according to claim 5, wherein the method further comprising:
filtering noise of the collected sound.

9. A non-transitory storage medium having stored thereon instructions that, when executed by a processor of an electronic device, causes the processor to perform a mode switching method, the electronic device comprising a collector, the method comprising:
turning on a silent mode of the electronic device when the electronic device enters into a predetermined scenario;
collecting sound of the predetermined scenario by the collector;
confirming prominent sound from the collected sound;
determining whether a duration of the prominent sound is greater than or equal to a first period of time;
confirming that the prominent sound is sample sound when the duration of the prominent sound is greater than or equal to the first period of time;
determining whether the collector has collected the prominent sound during a second period of time;
switching the silent mode to ringing mode of the electronic device when the collector has not collected the prominent sound during the second period of time; and
store the sample sound into the storage device;
start to count down for a second period of time when storing the sample sound into the storage device;
collect the prominent sound during the second period of time;
determine whether the prominent sound is the same as the sample sound by comparing the prominent sound with the sample sound stored in the electronic device;
determine whether the duration of the prominent sound is greater than or equal to a third period of time when the prominent sound is different from any sample sound; and
confirm that the prominent sound is as a new sample sound when the duration of the prominent sound is greater than or equal to the third period of time.

10. The non-transitory storage medium according to claim 9, wherein the method further comprising:
confirming at least one prominent sound when volume of the collected sound is greater than or equal to a predetermined volume.

11. The non-transitory storage medium according to claim 9, wherein the method further comprising:
deleting the sample sound when the silent mode is switched to ringing mode of the electronic device.

12. The non-transitory storage medium according to claim 9, wherein the method further comprising:
filtering noise of the collected sound.

* * * * *